Patented May 4, 1954

2,677,594

UNITED STATES PATENT OFFICE 2,677,594

PROCESS FOR SEPARATING FERROUS CHLORIDE FROM A GASEOUS MIXTURE OF $FeCl_2$ AND $NiCl_2$

Marion Ernest Graham, Parma, and Edward A. Beidler, Columbus, Ohio, assignors, by mesne assignments, to Republic Steel Corporation, Cleveland, Ohio, a corporation of New Jersey No Drawing. Application February 10, 1951, Serial No. 210,433

7 Claims. (Cl. 23—87)

The present invention comprises a process for separating ferrous chloride from a gaseous mixture of $FeCl_2$ and $NiCl_2$, and more particularly for treating such a gaseous mixture, so as to convert any nickel present therein to a non-volatile form of nickel, such as metallic nickel, and without appreciably altering the composition of the ferrous chloride originally present. Briefly, this is done by reacting any nickel chloride originally present in the gaseous mixture with metallic iron to form ferrous chloride and elemental nickel. The ferrous chloride thus formed is passed along with ferrous chloride originally present, leaving the nickel in some metallic form. It is recognized that the metallic nickel formed may not remain separate as such, but may possibly combine with some metallic iron present and which is provided for reaction purposes, as aforesaid, to form some nickel-iron alloy, which is usable commercially. However, the broad purpose is secured, which is to convert the nickel to a non-volatile form, the ferrous chloride produced and that originally present being separable for such use thereof as may be desired.

In the prior art illustrated, for example in the U. S. patents to Kroll, Nos. 2,396,792-3-4, all issued March 19, 1946, an attempt was made to separate ferrous metallic impurities from nickel. In accordance with these Kroll patents, it was attempted to carry out a transfer reaction between iron in elemental form and nickel chloride, so as to form nickel in elemental form and ferrous chloride. This was accomplished by Kroll in accordance with one of the patents aforesaid in a fused salt bath. In another of the Kroll patents aforesaid the same reaction was attempted to be accomplished without the bath, but conditions otherwise being substantially the same. In the third of these patents the purpose was to chloridize nickel and iron in a fused bath by passing chlorine therethrough; and the reaction aforesaid was relied upon to get selective chloridizing of the iron without chloridizing the nickel. In all the Kroll disclosures, the purpose was basically to provide pure nickel and to free this nickel from iron, among other metals, as an impurity, the iron being present in a very small amount in respect to the amount of nickel present. There was no attempt in accordance with the Kroll disclosures to effect a physical separation simultaneously with the principal chemical transfer reaction as aforesaid, but the physical separation was to be effected subsequent to the chemical reaction and by solution in a fused salt bath or by leaching in an aqueous solution, for example. In one of these patents, Kroll disclosed specifically that the chemical transfer reaction aforesaid is a reversible type reaction, which proceeds only to some intermediate equilibrium stage. In order to bias the equilibrium in a desired direction, Kroll resorted to the expedient of adding a substantially large excess of nickel chloride, 25% to 50%, for example.

In accordance with the present invention, the basic material to be worked upon in accordance with the present process is contemplated to contain relatively large percentages of iron, principally in the form of ferrous chloride, as compared with the amount of nickel. For example, in one ore which has been treated in accordance with the present process there is contained about thirty times as much iron as nickel. Even in treating stainless steel scrap, for example, the percentage of iron is far greater than the percentage of nickel present. This difference in raw material, however, is not presently relied upon as a basic distinction from the prior art, but is mentioned as illustrating a difference in the type of material which the present invention is adapted to treat, as compared with the material contemplated for use in the prior art.

In accordance with the present invention, it is contemplated that there will usually be present during the reaction sufficient iron in elemental form to react with all the chlorine initially introduced in the form of nickel chloride, so as to form therefrom ferrous chloride by the chemical transfer reaction aforesaid. Preferably also there will be a reasonable excess of elemental iron initially present over such equivalent or stoichiometric proportions as hereinafter more particularly set forth. The reaction is basically the same as that which was contemplated in accordance with the prior art teaching as described. However, in the present case, the reaction is caused to carry through to a substantial completion, irrespective of the reversible character of the reaction and some intermediate equilibrium end point, by separating from the process the ferrous chloride substantially as it is formed.

The purpose of the present invention is twofold: first, to convert substantially all the nickel chloride present in the gaseous phase in the starting material to nickel in metallic form, which may be used as such in some way known to the art, and second, to separate nickel chloride from iron chloride, so that the latter may be diverted to a suitable point at which it may be used or converted into some other useful product, the details of such use or conversion forming no part of the present invention.

Summarizing the present invention, therefore, it comprises establishing in a reaction zone a body of metallic iron, which if in solid form, is preferably in a mass which is gas-pervious, such, for example, as a mass of steel wool, and which preferably also is in such form as to present a relatively large surface area per unit of weight. This provides a large surface of the solid iron for reaction with the gas. Alternatively, if the iron is in liquid form, the gaseous mixture may be bubbled therethrough or otherwise passed in contact therewith, this gaseous mixture preferably being supplied to the bath of molten iron at a point below the surface thereof. This iron may then react with the nickel chloride in the gas, as hereinafter specifically set forth, the nickel produced going into solution in the molten iron and the ferrous chloride being released at the surface of the bath as substantially pure ferrous chloride. The use of a bath of molten iron lends itself particularly to a combined process including as one step, the present process, and as a second step, a process for the further treatment of ferrous chloride, which, per se, forms no part of the present invention and which, therefore, is not more particularly disclosed herein.

The present application is one of a group of seven co-pending applications, all the inventions of the same inventors, four of these cases relating to nickel and reactions involving nickel and the other three relating to cobalt and reactions involving cobalt. The cases may be compared and distinguished as follows:

a. Ser. No. 160,821, filed May 8, 1950, relates to treating a starting material in the non-gaseous (liquid and/or solid) form and consisting essentially of $NiCl_2$ and $FeCl_2$, and wherein there is more $FeCl_2$ than $NiCl_2$. This starting material is treated in a reaction or sublimation zone, in the presence of a certain amount of metallic iron, to produce a final product which is vaporized $FeCl_2$, removed from the sublimation zone as such, leaving only metallic iron and metallic nickel in the sublimation zone.

b. Ser. No. 210,433, filed February 10, 1951 (the present application), relates to treating a starting material, essentially the same as Ser. No. 160,821, except that in this instance the starting material is introduced into the reaction zone in a solely gaseous state. The reaction and the final products are substantially the same as in Ser. No. 160,821.

c. Ser. No. 160,822, filed May 8, 1950, relates to the preventing or minimizing of a possible reaction. The starting material consists essentially of ferrous chloride and metallic nickel. It is desired to separate these materials without permitting, or at least minimizing, a possible back reaction therebetween which would produce nickel chloride and metallic iron. To do this, the starting material is introduced into a reaction or sublimation zone in which metallic iron is present. The starting material as introduced into this zone is in a non-gaseous state. The final products are substantially pure ferrous chloride vapor, which is removed from the zone as such, and metallic nickel and metallic iron which remain in the zone.

d. Ser. No. 294,058, filed June 17, 1952, discloses a process for treating a starting material substantially the same as in Ser. No. 160,821. This case has been amended so as to preclude the claims reading upon separation of the products of the reaction by vaporization as in Ser. No. 160,821; but in this case the separation following the reaction is effected by withdrawing the metallic nickel produced (by a reaction the same as in Ser. No. 160,821) by withdrawing massive pieces of iron, to which the deposited nickel adheres physically, from the fused bath of the starting materials. Neither the ferrous chloride nor any nickel chloride present is intentionally volatilized. This application is junior to application Ser. No. 160,821, so that the only subject matter claimable therein is subject matter which cannot be supported by the disclosure of Ser. No. 160,821; all the common subject matter being claimed in Ser. No. 160,821.

e. Ser. No. 291,816, filed June 4, 1952, is the first of the three cobalt applications and is the cobalt counterpart of the nickel case, Ser. No. 160,821, distinguishing therefrom by being directed to cobalt and its chloride, rather than nickel and its respective chloride. This case is further distinguished in the degree of purity of the sublimate.

f. Ser. No. 320,835, filed November 15, 1952, is the cobalt counterpart of nickel case, Ser. No. 210,433. It distinguishes from cobalt case Ser. No. 291,816 in the same way discussed above as to the respectively corresponding nickel cases, while distinguishing from its corresponding nickel case, Ser. No. 210,433, by the differences between cobalt and nickel.

g. Ser. No. 321,514, filed November 19, 1952, is the cobalt case corresponding to the nickel case Ser. No. 160,822. It distinguishes from the other cobalt cases as discussed above in respect to the respectively corresponding nickel cases, while distinguishing from its nickel counterpart, Ser. No. 160,822, by the differences between nickel and cobalt.

The gaseous mixture must contain ferrous chloride and nickel chloride, but may also contain some one or more gases which are inert insofar as the contemplated reaction is concerned, for example, nitrogen. By the use of some additional, relatively inert gas as aforesaid, it is possible to use a gaseous mixture containing less than 100% of both ferrous chloride and nickel chloride respectively and in total, so as to operate the process at temperatures below the boiling points of both ferrous chloride and nickel chloride.

The preferred temperature range contemplated for use in the present case is from about 1650° F. up to the boiling point of iron. More particularly, the preferred temperature range is from about 1750° F. up to the melting point of iron for the phase of the process in which the iron present in the reaction zone is solid, while temperatures necessary for the maintenance of iron in the liquid phase may be used when operating in accordance with that phase of the invention.

Turning now to the details of the present invention, the first factor to be considered is the composition of the gaseous mixture being passed into the reaction zone and the origin thereof. The particular manner in which mixtures of ferrous chloride and nickel chloride are prepared for treatment in accordance with the present process, is no part of the present invention. However, the process is applicable in treating some ores, such as Nicaro, which contain both iron and nickel, with about thirty times as much iron as nickel. If such an ore be chloridized and the chlorides of iron and nickel vaporized from the chloridized ore, a mixture substantially in accordance with that contemplated in the present invention is produced. Similarly in recovering iron and nickel from alloy scrap containing both these metals, one method of recovering such metal values is to chloridize the entire scrap, then to treat the volatilized chlorides in accordance with the present invention.

The manner in which the chlorides of iron and nickel are volatilized is also no part of the present invention, it being contemplated generally that sufficient heat will be provided, so that the vapor pressure of these two chlorides will be sufficient in conjunction with the partial pressures of any inert gases present to cause volatilization of iron and nickel chlorides to the extent necessary or desired, in accordance with the present invention.

As to composition, it is, of course, contemplated that the gaseous mixture being treated may consist solely of $FeCl_2$ and $NiCl_2$ vapors. On the other hand, it is often desired, in accordance with the present invention, to operate at temperatures below the boiling points of these two chlorides. In order to do so, some relatively inert gas may be admixed with the vapors of these two chlorides, for example, nitrogen or even other chloride vapors which are inert as far as the present reaction is concerned. Even when operating at temperatures above the boiling points of both $FeCl_2$ and $NiCl_2$, some inert gases may be admixed therewith. It is further contemplated that any gas or gases, which are inert insofar as the present reaction is concerned, may be used along with the mixed chloride vapors, nitrogen being but one example of a gas which is operative under the circumstances.

The reaction may take place in any type of apparatus useable for this general purpose, particular details of the apparatus forming per se, no part of the present invention. For this reason the place or apparatus in which reaction is to be carried on is herein termed a "reaction zone." It is contemplated that any solid-to-gas or liquid-to-gas reaction apparatus known to the art, or which will occur to those skilled in the art from the present description and which is or may be made appropriate to the carrying on of the present process, may be employed.

The iron, which must be present in the reaction zone in accordance with the present invention, is particularly described as a body of metallic iron. It is contemplated that this may be a solid massive body, such as a bolt or rod or that it may be solid material in any desired form. Preferably, however, the metallic iron is present in a form providing a maximum surface area for contact with the gas in respect to the amount of iron present. Thus a relatively finely divided form of iron is usually preferable. Specifically, for example, it is contemplated, and it has been found, that steel wool is efficacious for this purpose. It is further contemplated that some form of sponge iron may be used in a mass which is preferably gas-pervious and which provides a very large surface area per unit of weight. On the other hand, if sufficient surface is provided, at which the reaction may take place, the particular form of the iron present is not critical.

It is also specifically contemplated, in accordance with the present invention, that the iron may be a molten body or bath and that the gaseous mixture may be bubbled therethrough, or otherwise brought into contact therewith, as by being supplied to the bath at a point or points below the surface thereof. Here, again, the arrangement must be such that there is afforded adequate time for the chemical reaction desired to take place.

The chemical reaction in question is, per se, known and is disclosed, for example, in the Kroll patents aforesaid. This reaction is:

$$NiCl_2 + Fe = Ni + FeCl_2$$

This reaction has been found to be reversible in character as set forth above. In order that the reaction shall proceed from left to right, as hereinabove given in the equation, the $FeCl_2$ produced is removed from the vicinity of the reaction, i. e. from the reaction zone, to a suitable delivery point. It is also practically necessary that adequate surface of the iron be provided, so that even if some nickel were to coat some of the iron surface originally provided, there would still be adequate free surface area of iron available for contact and reaction with the remaining gases.

If all the nickel is to be removed from the gases, the iron must be present in an amount at least equal to the amount required to react with all the chlorine introduced in the gases to be treated as $NiCl_2$, to form $FeCl_2$. In the usual course, however, there will be several times this much iron present, as it is, of course, possible for some of the iron to be mechanically shielded or blocked by the nickel freed by the chemical reaction which might prevent reaction of the so-shielded iron with remaining gases or gases following the first gases. For this reason, it is usual in practicing the present invention, to provide a considerable amount of iron in excess of the strict stoichiometric requirements. The particular degree of excess of iron is not critical, the purpose of the excess being, as aforesaid, to insure the maximum completion of the reaction.

The temperatures in the reaction zone have been stated broadly to be within the limitations of about 1650° F. up to the boiling point of metallic iron. This broad range may be subdivided into two ranges, with the dividing line therebetween set at the melting point of the iron present. These two ranges and the limits thereof will now be considered.

The boiling points of $NiCl_2$ and $FeCl_2$ at atmospheric pressure are about 1800° F.–1900° F. Therefore, at temperatures below this general boiling point range, one or both of these materials will be below its boiling point. The present process is operable, however, below this boiling point by having an inert gas present to make up a part of the total pressure of the gaseous mixture, the remainder being made up of the partial pressures of $FeCl_2$ and $NiCl_2$ respectively.

It has been found by experiment, as hereinafter set forth in particular examples, that when the process is attempted to be operated at temperatures substantially below about 1650° F., the rate of the desired chemical reaction appears to be so slow that no substantial completion of the desired reaction aforesaid can be attained within a reasonable time. For this reason, therefore, the temperature of about 1650° F. is stated as the low limit of temperature in accordance with the present invention. This is so, not because the temperature of 1650° F. is narrowly critical, but because it represents a fair approximation of the economic low limit for the process, considering the rate of reaction and the time necessary for exposure of the gases to the metallic iron in the reaction zone.

From many points of view it is desirable to operate with the iron in the reaction zone in solid form. This enables the process to be carried out using relatively simple apparatus, as compared with apparatus which would be required if the iron in the reaction zone were to be in liquid form. As such, there is a top limit for the temperature in the reaction zone at the melting point of iron for one preferred phase of the process. From the point of view of the present process alone, this lower range is usually preferred.

Considering, however, the joint process above referred to, wherein the present process is but the first step, and a process for treating ferrous chloride vapors in a further way (not herein disclosed and forming no part of the present invention) is a second step, it may be desirable to use the iron in the reaction zone in the liquid state. For this reason, therefore, the present invention is to include temperatures between the melting point and boiling point of this iron. In this connection the temperatures of the melting point and boiling point of iron should be taken for the purposes of this application, not necessarily of pure elemental iron, which are relatively high, but of commercial grade of iron such, for example, as cast iron, wherein the melting point is relatively low. The effect of a progressively greater alloying of the iron bath with nickel is also to be considered as this process requires that the metal remain in liquid form.

It is recognized that many commercial forms of nickel contain cobalt as an alloy to a certain relatively small extent. From the point of view of the present invention, such materials seem to operate in exactly the same way as has been described herein as to nickel alone. As such, therefore, the term "nickel" as used in the present application and in the claims thereof, is to be construed as including commercial nickel alloyed with about the usual amount of cobalt and corresponding nickel salts admixed with about that amount of the respectively corresponding cobalt salts.

The process of the present invention is further illustrated by the following particular examples:

*Example I*

In order to illustrate the necessity for maintaining the temperature in the reaction zone at at least 1650° F. to obtain efficient conversion of the NiCl$_2$ to non-volatile form, a comparison may be made between the following two experimental tests:

In the first of these tests, about 31 grams of a mixture of NiCl$_2$ and FeCl$_2$, wherein these materials were present in the weight ratio of 30 parts of FeCl$_2$ to one part of NiCl$_2$, was heated to 1500° F. and a current of nitrogen passed over the solid material. The resulting mixture of nitrogen, FeCl$_2$ vapor and NiCl$_2$ vapor was contacted with a plug of steel wool weighing about 2.6 grams and therefore containing approximately three times as much iron as would be required to react with all the chlorine present as NiCl$_2$ to form FeCl$_2$. The gaseous and solid reactants were all maintained at a temperature of about 1500° F. The gaseous mixture aforesaid was passed through the steel wool plug for a period of fifty minutes, at the end of which it was found that only about 50% of the NiCl$_2$ in the vapor had been converted to an insoluble form; while the remainder passed on through the steel wool plug and was later condensed along with the FeCl$_2$.

In the second test, conducted with the same materials and in a similar manner, except that the reactants were maintained at the temperature of 1650° F., the vapor mixture was passed through the steel wool plug for about 15 minutes. At the end of this time it was found that 90% of the NiCl$_2$ had been converted to an insoluble form and remained as metallic nickel deposited on the steel wool of the plug.

It was thus found that the reaction between NiCl$_2$ vapor and metallic iron to produce metallic nickel and FeCl$_2$ vapor takes place much more rapidly and completely at a temperature of at least 1650° F. than below this temperature. For this reason, 1650° F. may be taken as the practical minimum temperature for the operation of this process.

*Example II*

Although the temperature of 1650° F. set forth above, is the practical minimum at which the process may be successfully operated, it is found that by operating at temperatures somewhat above this minimum, an even greater efficiency of reaction is attained. When a mixture of NiCl$_2$ and FeCl$_2$ in the same proportions employed in the tests given in Example I was vaporized in a current of nitrogen and was similarly contacted with a steel wool plug at a temperature of 1750° F., it was found that about 98.6% of the NiCl$_2$ had been converted to metallic nickel, which was retained on the steel wool plug. When the process was operated at the temperature of 1850° F. utilizing the same proportions of FeCl$_2$ and NiCl$_2$, it was found that about 98.7% of the NiCl$_2$ vapor was converted to metallic nickel by contact with the steel wool plug.

*Example III*

Although mixtures of iron and nickel chlorides will most often be found to contain a considerable preponderance of ferrous chloride, and the examples given above have illustrated the application of this process to such commonly occurring mixtures, an equally effective separation can be obtained using mixtures containing substantially higher percentages of NiCl$_2$. For example, a mixture consisting of 10 grams of FeCl$_2$ and 10 grams of NiCl$_2$ was vaporized in a current of nitrogen and the resulting gaseous mixture was contacted with 15 grams of steel wool, all the reactants being maintained at a temperature of about 1900° F. After all the vapor had been passed through and in contact with the steel wool, it was found that about 99.8% of the NiCl$_2$ had been converted to metallic nickel, which deposited onto the steel wool plug. Thus the effective separation of the two chlorides may be obtained even when relatively high percentages of nickel are present in the original starting mixture.

*Example IV*

The following example is given to illustrate the method of the invention wherein an FeCl$_2$-NiCl$_2$ vapor mixture is contacted with molten iron. A vapor mixture consisting of nitrogen (as the carrier gas) and equal parts of FeCl$_2$-NiCl$_2$ by weight was bubbled through a bath of molten cast iron by submerging the exit end of a suitable duct ⅛" below the surface of such bath. The vapor mixture was forced through the duct at a pressure sufficient to cause the gases to bubble through the molten iron to the surface thereof. The vapors were carried thence out of contact with the molten iron bath and were subsequently condensed at a point spaced therefrom.

The cast iron bath contained in a graphite crucible was found to have 0.03% nickel and 5.5% carbon initially. The chloride vapors were introduced at the rate of about 7½ grams of the mixed chlorides per minute. During the run, the liquid cast iron bath was maintained at a temperature of about 2650° F. The run was carried on in this manner for thirty minutes, so that a total of about 220 grams of the mixed chloride vapors were contacted with the molten iron, the total weight of the molten cast iron being about one pound. Thus more than a sufficient quantity of iron was present to react with all of the chlorine present as nickel chloride. At the end of the run it was found that about 55% of the $NiCl_2$ introduced had been converted to a non-volatile form of nickel, and that the final total nickel content of the bath was about 5.5%.

A second run was carried out using a chloride mixture having the same composition and using a molten cast iron bath of the same composition as described above, while maintaining the temperature of the bath at 2800° F. In this second run, the contact of the chloride vapors with the iron was improved by immersing the exit end of the duct, through which the chloride vapors were introduced, to a depth of about ¼" below the surface of the cast iron bath, whereas in the previous run the end of the duct had been immersed to a depth of only about ⅛". In the second run the total amount of iron in the bath was increased to about 1½ pounds. The mixed chloride vapors were again introduced at the rate of about 7½ grams per minute for a period of about ½ hour. At the end of this run it was found that about 71% of the $NiCl_2$ in the vapor mixture had been converted to a non-volatile form of nickel and was retained in the molten bath. The molten bath was found to contain about 5% metallic nickel at the end of the test.

While there has been disclosed herein a principal process and certain specific variants thereof, other alternatives and equivalents will occur to those skilled in the art from the foregoing disclosure. We do not wish to be limited, therefore, except by the scope of the appended claims, which are to be construed validly, as broadly as the state of the prior art permits.

What is claimed is:

1. The process of separating ferrous chloride from a solely gaseous mixture containing a substantial proportion of $NiCl_2$ and an amount of $FeCl_2$ at least as great as the amount of said $NiCl_2$, comprising the steps of establishing in a reaction zone a body of metallic iron, passing said solely gaseous mixture into and through said reaction zone so as to contact it with said metallic iron during its passage therethrough and so as to provide a contact time between said solely gaseous mixture and said metallic iron in said zone adequate for chemical reaction therebetween for a conversion of all of the nickel chloride present to a non-volatile form of nickel, said body of metallic iron being stoichiometrically sufficient in amount to react with all of the chlorine combined with nickel as $NiCl_2$ in said gaseous mixture which is introduced into and passed through said reaction zone in contact with said metallic iron so as to form $FeCl_2$, maintaining the temperatures of said gaseous mixture and of said metallic iron in said reaction zone in the range of about 1650° F. up to the boiling point of the metallic constituents present, and separating ferrous chloride, which is substantially free of $NiCl_2$, by withdrawing ferrous chloride vapor from said zone to provide substantially pure separated ferrous chloride as one product of the process.

2. The process in accordance with claim 1, wherein said body of metallic iron is a gas-pervious body and is so positioned in said reaction zone that said gaseous mixture passes therethrough in its passage through said reaction zone.

3. The process in accordance with claim 1, wherein said body of metallic iron consists essentially of a body of steel wool.

4. The process in accordance with claim 1, wherein said body of metallic iron is a body of molten iron, wherein the step of passing said gaseous mixture through said reaction zone is effected by passing said gaseous mixture in intimate contact with said molten iron, and wherein said temperature range is that in which said metallic iron will be in the molten state.

5. The process in accordance with claim 1, wherein said body of metallic iron is a body of molten iron, wherein the step of passing said gaseous mixture through said reaction zone is effected by passing said gaseous mixture into said molten iron from at least one point below the surface thereof, so that said gaseous mixture bubbles up through said molten iron, and wherein said temperature range is that in which said metallic iron will be in the molten state.

6. The process in accordance with claim 1, wherein said body of metallic iron is retained in the solid state, and wherein said temperature range is from about 1750° F. up to the melting point of the metallic constituents present.

7. The process in accordance with claim 1, wherein said gaseous mixture includes at least one additional gas which is inert in the process, whereby to enable the process to be operated below the boiling points of both $NiCl_2$ and $FeCl_2$.

References Cited in the file of this patent

UNITED STATES PATENTS

| Number | Name | Date |
| --- | --- | --- |
| 2,396,792 | Kroll | Mar. 19, 1946 |
| 2,396,793 | Kroll | Mar. 19, 1946 |
| 2,396,794 | Kroll | Mar. 19, 1946 |

OTHER REFERENCES

Lewis: "First Year College Chem.," 1945 ed., pp. 48–50, Barnes and Noble, Inc., N. Y.

McPherson and Henderon: "General Chemistry," third ed., pages 305, 306. Ginn and Co., N. Y.

"Handbook of Physics and Chemistry," 28th ed., pages 394–395, 418–419, 420–421. Chemical Rubber Publishing Co., Cleveland, Ohio.

J. W. Mellor's "A Comprehensive Treatise on Inorganic and Theoretical Chemistry," vol. 14, 1935 ed., page 15, and vol. 15, page 418. Longmans, Green and Co., N. Y.